(12) United States Patent
Gettel et al.

(10) Patent No.: US 6,227,819 B1
(45) Date of Patent: May 8, 2001

(54) FUEL PUMPING ASSEMBLY

(75) Inventors: Bryan J. Gettel, Pigeon; Glenn A. Moss, Cass City; Joseph M. Ross, Millington, all of MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/594,141

(22) Filed: Jun. 14, 2000

Related U.S. Application Data

(63) Continuation-in-part of application No. 09/527,722, filed on Mar. 17, 2000, which is a continuation-in-part of application No. 09/282,053, filed on Mar. 29, 1999.

(51) Int. Cl.[7] .............................. F04B 17/00; F04B 35/04

(52) U.S. Cl. ........................................ 417/423.1; 415/55.1

(58) Field of Search .......................... 417/423.7, 423.12, 417/244, 423.3, 423.1, 44.2; 415/55.1, 55.6, 55.2; 123/514

(56) References Cited

U.S. PATENT DOCUMENTS

| | | |
|---|---|---|
| 3,694,110 | 9/1972 | Guinard . |
| 3,877,845 * | 4/1975 | Green et al. ...................... 417/423.7 |
| 4,396,358 | 8/1983 | De Concini . |
| 4,403,910 | 9/1983 | Watanabe et al. . |
| 4,445,820 | 5/1984 | Hayashi et al. . |
| 4,445,821 | 5/1984 | Watanabe et al. . |
| 4,449,827 * | 5/1984 | Kemmer .......................... 417/413.12 |
| 4,449,891 | 5/1984 | Kemmner . |
| 4,451,213 | 5/1984 | Takei et al. . |
| 4,466,781 | 8/1984 | Kemmner . |
| 4,493,620 | 1/1985 | Takei et al. . |
| 4,508,492 | 4/1985 | Kusakawa et al. . |
| 4,573,882 | 3/1986 | Watanabe et al. . |
| 4,586,877 | 5/1986 | Watanabe et al. . |
| 4,591,311 | 5/1986 | Matsuda et al. . |
| 4,645,429 | 2/1987 | Asami et al. . |
| 4,648,809 | 3/1987 | Gensberger . |
| 4,718,827 * | 1/1988 | Sutton et al. ........................ 417/244 |
| 4,778,354 | 10/1988 | Idei . |
| 4,822,258 | 4/1989 | Matsuda et al. . |
| 4,915,582 | 4/1990 | Nishikawa . |
| 5,011,367 | 4/1991 | Yoshida et al. . |
| 5,040,954 | 8/1991 | Iwai . |
| 5,058,557 | 10/1991 | Frank et al. . |
| 5,080,554 | 1/1992 | Kamimura . |
| 5,096,391 | 3/1992 | Tuckey . |
| 5,173,037 * | 12/1992 | Martin et al. ...................... 417/423.3 |
| 5,257,916 | 11/1993 | Tuckey . |
| 5,332,369 | 7/1994 | Jensen . |
| 5,338,151 | 8/1994 | Kemmner et al. . |

(List continued on next page.)

FOREIGN PATENT DOCUMENTS 0 784 158A2   7/1997   (EP) .

*Primary Examiner*—Teresa Walberg
*Assistant Examiner*—Leonid Fastovsky
(74) *Attorney, Agent, or Firm*—Reising, Ethington, Barnes, Kisselle, Learman & McCulloch, P.C.

(57) ABSTRACT

A fuel pump assembly for drawing fuel from a reservoir and supplying that fuel to an engine and including a fuel pumping module and an electric motor supported in a pump housing. The pumping module includes a module housing and an impeller that the motor rotates in an impeller cavity of the module housing. The impeller includes upper and lower vanes that move fluid through upper and lower portions of a semi-circular pumping channel, respectively. An exhaust port extends through the module housing and communicates with an exit passage of the pumping channel. An arcuate trench is disposed in the upper wall of the module housing and communicates with the outlet end of the pumping channel to redirect exiting fuel upward from the pumping module to a fuel pump housing outlet. The exit passage of the pumping channel extends tangentially outward into the trench. so that fuel exiting the pumping channel is relatively unimpeded.

13 Claims, 6 Drawing Sheets

U.S. PATENT DOCUMENTS

| | | | |
|---|---|---|---|
| 5,338,165 | * 8/1994 | Brockner et al. | 417/423.1 |
| 5,348,452 | 9/1994 | Yamamoto et al. . | |
| 5,350,281 | 9/1994 | Hagshenas . | |
| 5,372,475 | 12/1994 | Kato et al. . | |
| 5,378,125 | * 1/1995 | Frank et al. | 417/423.3 |
| 5,391,062 | * 2/1995 | Yoshioka | 417/423.3 |
| 5,399,075 | * 3/1995 | Frank et al. | 417/423.1 |
| 5,401,147 | 3/1995 | Yu . | |
| 5,413,457 | * 5/1995 | Tuckey | 415/55.6 |
| 5,454,697 | 10/1995 | Nakanishi . | |
| 5,472,321 | 12/1995 | Rademacher . | |
| 5,486,087 | 1/1996 | Treiber et al. . | |
| 5,498,124 | 3/1996 | Ito et al. . | |
| 5,513,950 | 5/1996 | Yu . | |
| 5,525,048 | 6/1996 | Tuckey . | |
| 5,549,446 | 8/1996 | Gaston et al. . | |
| 5,551,835 | * 9/1996 | Yu et al. | 415/55.1 |
| 5,551,842 | 9/1996 | Schmid et al. . | |
| 5,571,001 | 11/1996 | Fukuda et al. . | |
| 5,586,858 | 12/1996 | Tuckey . | |
| 5,620,048 | 4/1997 | Beauquin . | |
| 5,624,245 | 4/1997 | DeClerck et al. . | |
| 5,630,399 | 5/1997 | Nomura et al. . | |
| 5,642,987 | 7/1997 | Taricco . | |
| 5,649,514 | * 7/1997 | Okada et al. | 123/514 |
| 5,674,057 | 10/1997 | Guardiani et al. . | |
| 5,680,700 | 10/1997 | Tuckey . | |
| 5,702,229 | 12/1997 | Moss et al. . | |
| 5,762,481 | 6/1998 | Oi . | |
| 5,765,992 | * 6/1998 | Muramatsu et al. | 415/55.1 |
| 5,810,568 | 9/1998 | Whitefield et al. . | |
| 5,833,437 | 11/1998 | Kurth et al. . | |
| 5,857,841 | 1/1999 | Kobayashi et al. . | |
| 5,890,880 | 4/1999 | Lustwerk . | |
| 5,904,468 | * 5/1999 | Dobler et al. | 415/55.2 |
| 5,961,293 | * 10/1999 | Clemmons et al. | 417/44.2 |
| 6,068,456 | * 5/2000 | Tuckey et al. | 417/423.3 |
| 6,113,363 | * 9/2000 | Talaski | 417/423.3 |

* cited by examiner

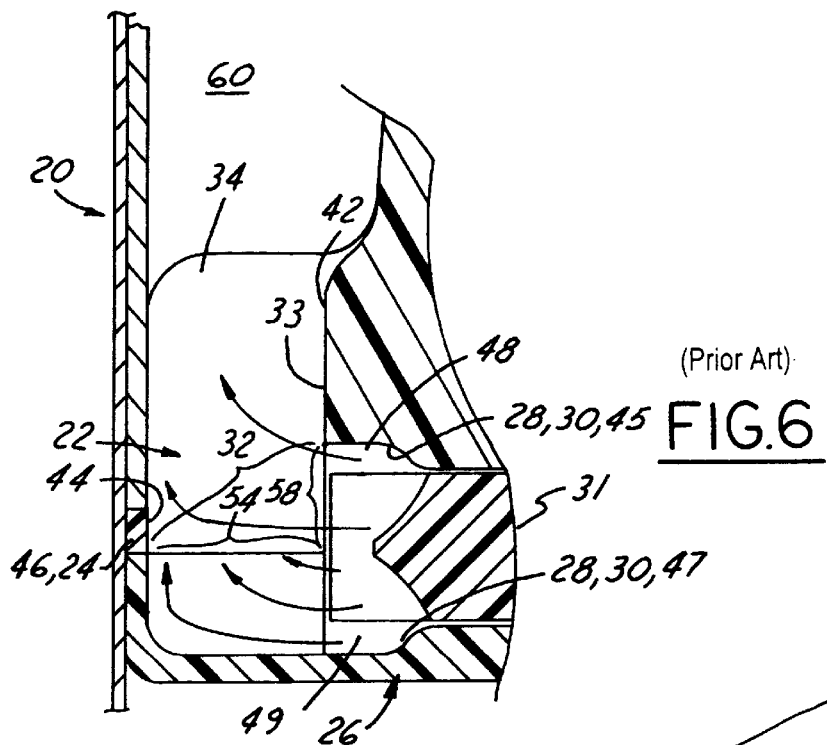
(Prior Art) FIG.6
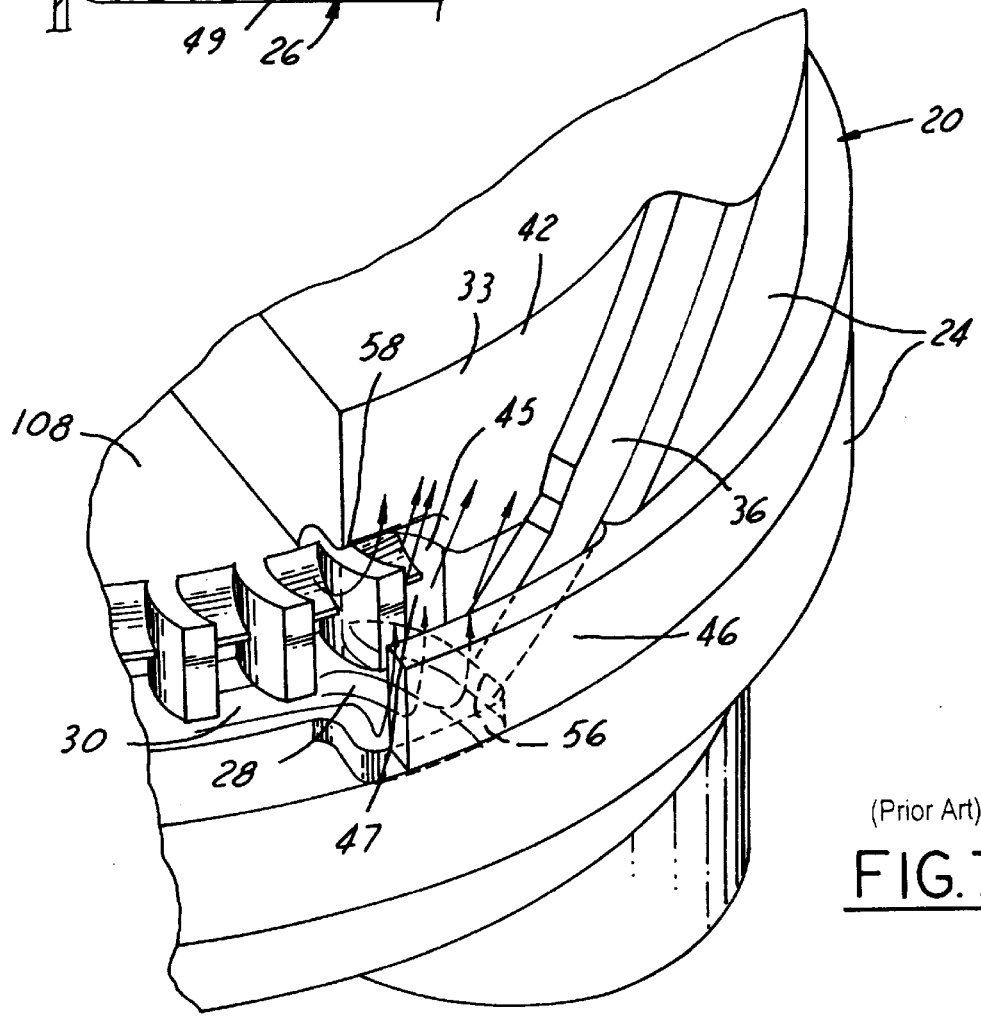
(Prior Art) FIG.7

FUEL PUMPING ASSEMBLY

REFERENCE TO COPENDING APPLICATION

This application is a continuation-in-part of copending application, Ser. No. 09/527,722, filed Mar. 17, 2000, entitled "In-Tank Fuel Pump Reservoir" which in turn is a continuation-in-part of copending application, Ser. No. 09/282,053, filed Mar. 29, 1999, entitled "Fuel Pump With Low Pressure Motor Chamber".

TECHNICAL FIELD

This invention relates generally to a fuel pumping assembly for drawing fuel from a reservoir and supplying that fuel to an engine.

BACKGROUND OF THE INVENTION

It is known for a fuel pumping assembly to include an electric motor and a fuel pump module supported together in a housing. The fuel pump module in such an assembly will generally include a module housing, an impeller that is driven by the electric motor and rotates within an impeller cavity formed in the module housing, and a semi-circular pumping channel including upper and lower pumping channel portions formed around a circular periphery of the impeller cavity. The impeller may include axially upper and lower impeller vanes spaced around an outer circumferential periphery of the impeller that move fluid through the upper and lower portions of the pumping channel, respectively, as the impeller rotates within the impeller cavity. The module housing will also include an inlet port and an exhaust port that may extend axially through respective lower and upper walls of the module housing and connect with respective inlet and outlet ends of the pumping channel. To improve pump efficiency and reduce power requirements, it is desirable to shape the pumping channel and the exhaust port to minimize fluid losses.

For example, European Patent Application EPO 784 158 AZ discloses an electric motor regenerative turbine fuel pump assembly that improves efficiency by shaping the exhaust port of its pump module to include an arcuate trench in an upper wall of its module housing. As shown in FIGS. 1–7, the pump module 20 has an exhaust port 22 located along a portion of a circumferential sidewall 24 of a module housing 26 of the module 20 adjacent an exit end 28 of its pumping channel 30 in which an impeller 31 is received. The exhaust port 22 also includes an opening 32 that leads from the outlet end 28 of the pumping channel 30 into the trench 33. The trench 33 is defined by a generally vertical trench end wall 34 disposed upstream from a ramp 36 that inclines from a floor 38 of the trench 33, in a downstream direction, i.e., the direction of impeller rotation, to an upper surface 40 of the module housing 26. The trench 33 is further defined by an arcuate radially inner wall 42 that stands opposite and parallel to an arcuate radially outer wall 44. A thin circumferential band of material 46 surrounds the module housing 26 and defines the outer wall 44 of the trench 33. However, the exhaust port opening 32 is disposed radially outward from the impeller 31 and the exit end 28 of the pumping channel 30. As best shown in FIGS. 6 and 7, this requires fuel exiting upper and lower portions 45, 47 of the pumping channel 30 to impact respective upper and lower channel exit end walls 48, 49 of the upper and lower portions 45, 47 of the pumping channel 30 before turning radially outward to exit through the exhaust port opening 32 resulting in fluid losses. In other words, the exit end 28 of the pumping channel 30 forms an elbow redirecting fluid flow radially outward from the channel 30 and through the exhaust port opening 32.

The exhaust port opening 32 includes a generally rectangular horizontal portion 54 defined on three sides by the trench end wall 34, the outer wall 44 and a leading or upstream edge 56 of the ramp 36. A fourth side of the horizontal portion 54 of the exhaust port opening 32 is defined by an imaginary line extending through space between respective radially inner ends of the sides defined by the trench end wall 34 and the upstream edge 56 of the ramp 36. The exhaust port opening 32 also includes a generally rectangular vertical portion 58 formed into the inner wall 42. The vertical portion 58 of the exhaust port opening 32 is positioned to allow fuel to exit directly from the upper portion 45 of the pumping channel 30 into the exhaust port trench 33. The horizontal portion 54 of the exhaust port opening 32 is formed in the floor 38 of the trench 33 to allow fuel to exit vertically upward from the lower portion 47 of the exit end 28 of the pumping channel 30 and into the trench 33. However, fuel exiting vertically through the horizontal portion 54 of the exhaust port opening 32 necessarily impinges on fuel exiting laterally from the vertical portion 58 of the exhaust port opening 32 resulting in impingement mixing at the opening and associated turbulence and fluid losses.

As best shown in FIG. 6, the exhaust port trench 33 is shaped to discharge the mixed upper and lower fuel flows up the ramp 36 and generally vertically away from the pumping module 20 into a chamber 60 of the fuel pump housing 62 that contains the electric motor. The fuel continues past the motor and out an outlet of the pump housing to supply fuel under pressure to an operating engine. The fuel pumping assembly of the Denso pump includes an electric motor (not shown) connected to and constructed to rotate the impeller.

SUMMARY OF THE INVENTION

The invention is a fuel pumping assembly that includes a fuel pump module supported in a fuel pump housing. The fuel pump module includes an impeller rotatably supported within an impeller cavity formed in a pump module housing, and a generally semi-circular pumping channel formed in the housing around a generally circular periphery of the impeller cavity. The impeller includes axially upper and lower impeller vanes spaced around an outer circumferential periphery of the impeller that are configured and positioned to move fluid through the pumping channel as the impeller rotates within the impeller cavity. The module housing includes inlet and exhaust ports communicating with respective inlet and exit passages of the pumping channel.

The exit passage of the pumping channel extends generally tangentially outward through the sidewall of the module housing. This aligns the exhaust port with the tangential flow of fuel from the exit passage of the pumping channel such that fuel exits the pumping channel relatively unimpeded and flows smoothly into the trench. Therefore, a fuel pumping assembly constructed according to the invention is able to pump fuel more efficiently.

Preferably, the cross-sectional area of the exit passage of the pumping channel gradually increases toward the exhaust port which further reduces back pressure on the impeller and increases efficiency. The exit passage of the pumping channel and the exhaust port opening are constructed to allow a lower fuel stream exiting the lower portion of the pumping channel to remain parallel to and below an upper fuel stream exiting the upper portion of the pumping channel while flowing into the exhaust port trench which reduces fluid losses by avoiding impingement mixing. The exhaust port opening and trench are constructed to allow lower and upper fuel streams from the lower and upper portions of the pumping channel, respectively, to both exit laterally into the exhaust port trench which prevents uneven back pressure on the impeller upper and lower vanes and unbalanced impeller loads that would otherwise result in reduced efficiency or even spin welding of the impeller to the impeller chamber. Preferably, the pump housing surrounding the fuel pump module defines a radially outer wall of the exhaust port trench precluding the need to form such a wall while molding the module housing. The trench may include a ramp that smoothly redirects exiting fuel axially upward from the pumping module, again improving efficiency and reducing power requirements.

Objects, features and advantages of this invention include a turbine pump that has significantly improved efficiency, may be readily incorporated into existing fuel pump designs, has significantly improved balancing and decreases axial loads on the impeller particularly during high flow rate operating conditions, and is of relatively simple design and economical manufacture and assembly and in service has a significantly increased useful life.

BRIEF DESCRIPTION OF THE DRAWINGS

These and other objects, features and advantages of this invention will be apparent from the following detailed description of the preferred embodiment(s) and best mode, appended claims, and accompanying drawings in which:

FIG. 6 is an enlarged cross-sectional view of a peripheral region of the prior art fuel pump module of FIG. 1 taken along line 6—6 of FIG. 1 and with arrowed lines indicating fuel flow paths;

FIG. 7 is a perspective view of the prior art fuel pump module of FIG. 1 with arrowed lines indicating fluid flow paths;

DETAILED DESCRIPTION

Figure 1:
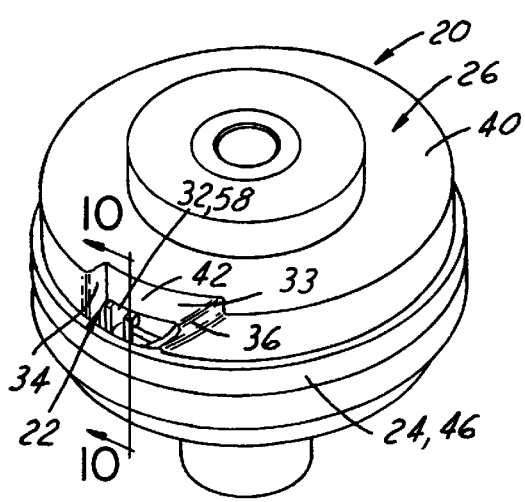
FIG. 1 is a perspective view of a fuel pump module from a prior art electric motor regenerative turbine fuel pump.
Figure 2:
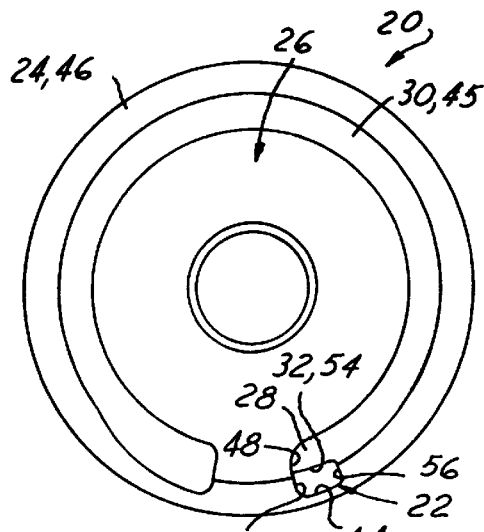
FIG. 2 is a bottom view of an upper cap portion of the prior art fuel pump module of FIG. 1.
Figure 3:
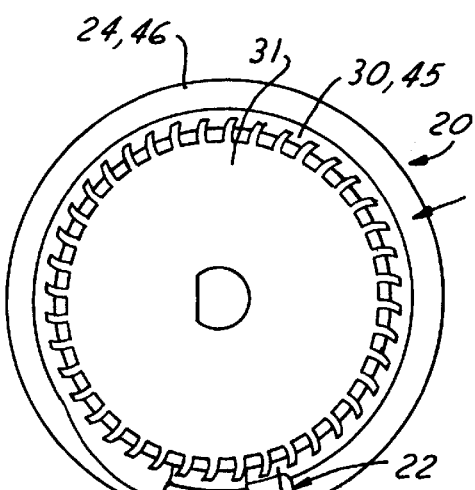
FIG. 3 is a bottom view of the upper cap and impeller of the prior art fuel pump module of FIG. 1.
Figure 4:
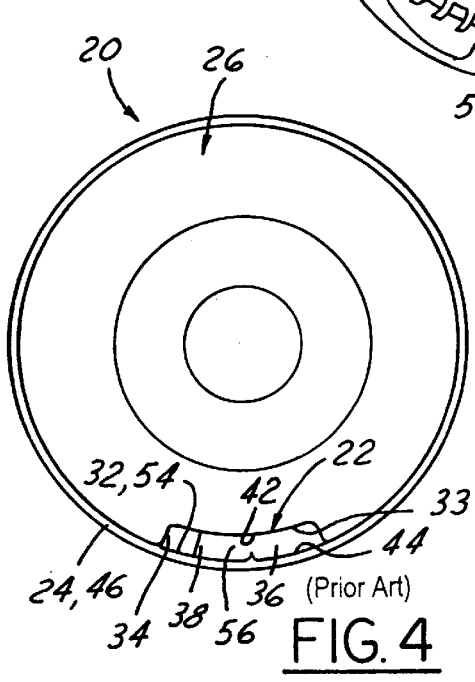
FIG. 4 is a top view of the upper cap of FIG. 2.
Figure 5:
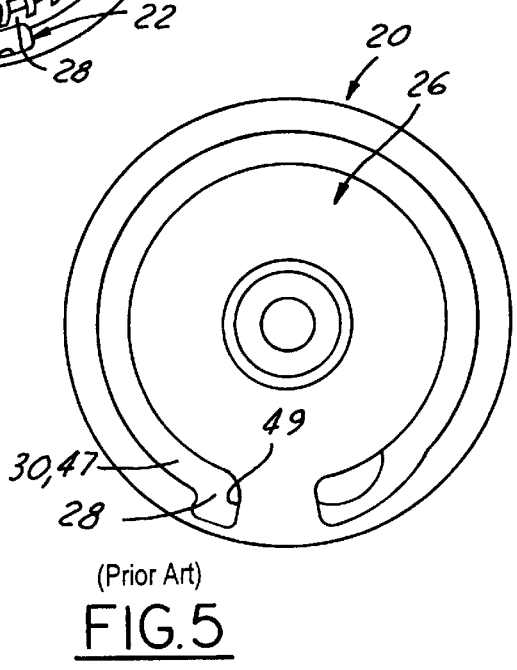
FIG. 5 is a top view of a base portion of the prior art fuel pump module of FIG.1.

A fuel pumping assembly for drawing fuel from a reservoir and supplying that fuel at increased pressure to a desired location such as an engine is shown at 100 in FIGS. 8–13. The assembly 100 includes a fuel pump housing 102 and a fuel pump module 104 supported in the pump housing 102. The fuel pump module 104 includes a module housing 106 and an impeller 108 that is rotatably supported within an impeller cavity 110 formed in the module housing 106. The module housing 106 also includes a generally semi-circular pumping channel 112 hving upper and lower channel portions 114, 116 formed into a roof 118 and a floor 120 of the impeller cavity 110, respectively, around a generally circular periphery of the impeller cavity 110.

The upper and lower channel portions 114, 116 are separated along an approximate 120° high pressure portion of their lengths by a rib 121 that extends radially inward toward the impeller from an outer circumferential wall of the pumping channel 112.

The impeller 108 has axially upper and lower impeller vanes 122, 124 spaced around an outer circumferential periphery of the impeller 108 that are configured and positioned to move fluid through the upper and lower pumping channel portions 114, 116 respectively, as the impeller 108 rotates within the impeller cavity 110. The module housing 106 includes inlet and exhaust ports 126, 128 that extend generally axially through respective lower and upper walls 130, 132 of the module housing 106 and communicate with respective inlet and exit passages 134, 136 of the pumping channel 112.

Figure 8:
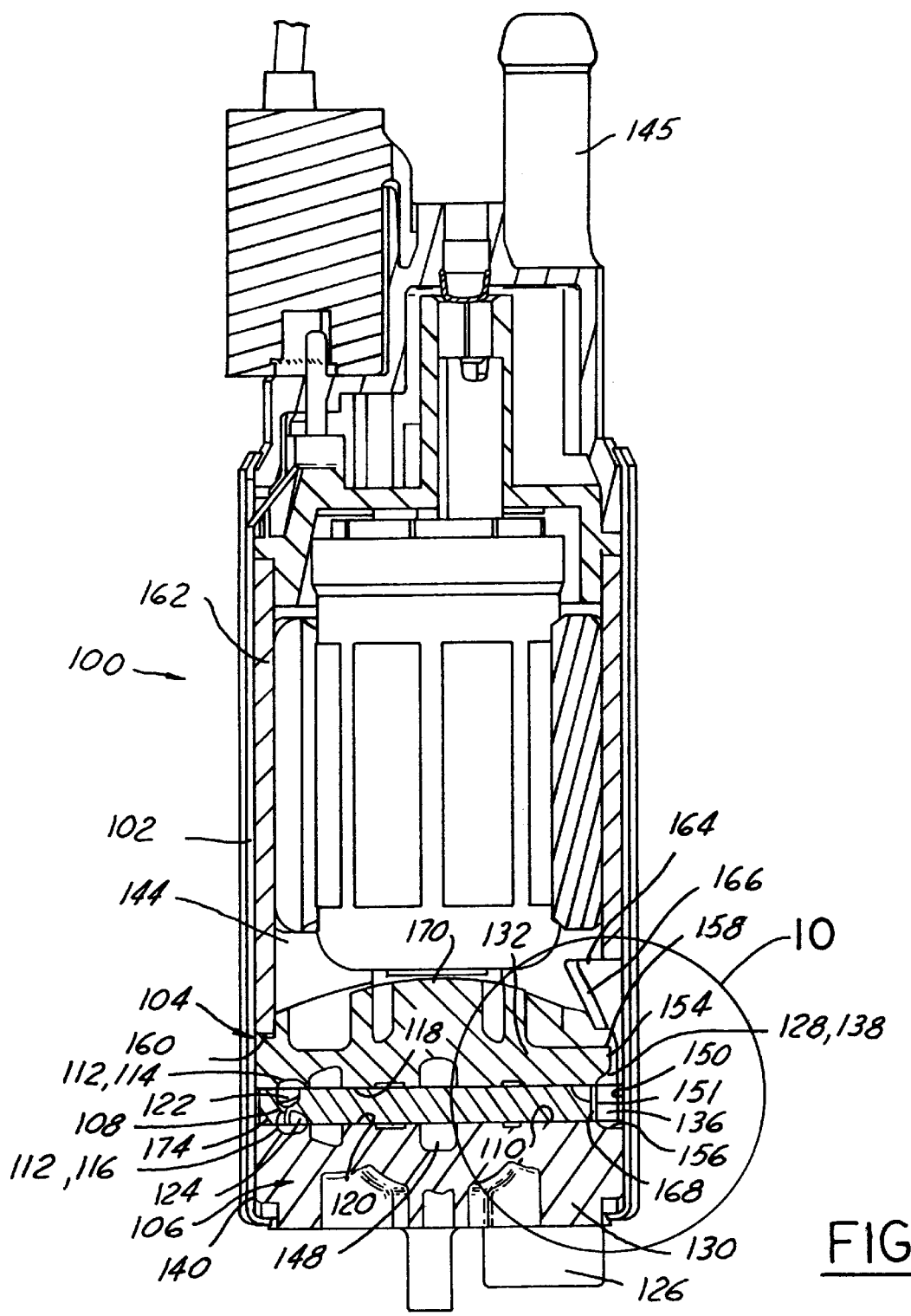
FIG. 8 is a cross-sectional front view of a fuel pump assembly embodying the invention.
Figure 9:
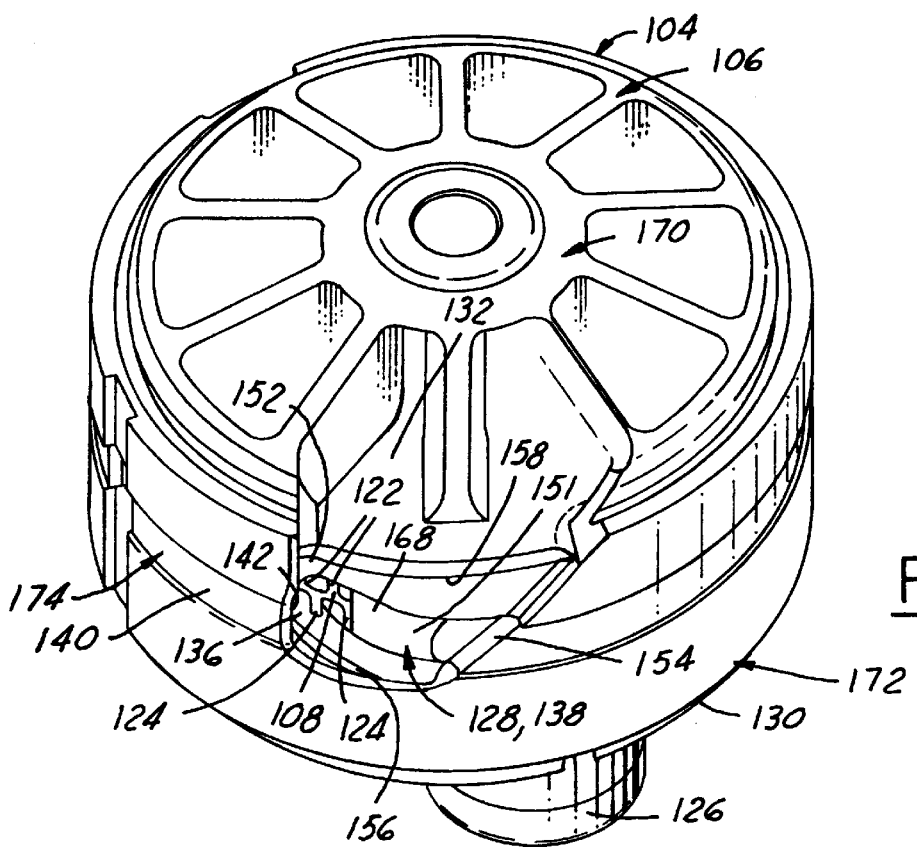
FIG. 9 is a perspective view of a fuel pump module of the fuel pump assembly of FIG. 8.

The exhaust port 128 includes an arcuate trench 138 formed in the upper wall 132 of the module housing 106 along a portion of a circumferential side wall 140 of the module housing 106 adjacent the exit passage 136 of the pumping channel 112. The exhaust port 128 also includes an opening 142 from the exit end 136 of the pumping channel 112 into the trench 138. As is best shown in FIG. 8, the exhaust port trench 138 is configured or shaped and positioned to redirect exiting fuel upward from the pumping module 104 into a chamber 144 of the fuel pump housing 102 that contains the electric motor and that leads to a fuel pump assembly outlet 145. As is also shown in FIG. 8, the assembly 100 also includes an electric motor 146 that is supported in the pump housing 102 and is drivingly connected to the impeller 108 by a drive shaft 148. When energized, the electric motor causes the impeller 108 to rotate within the impeller cavity 110.

Figure 12:
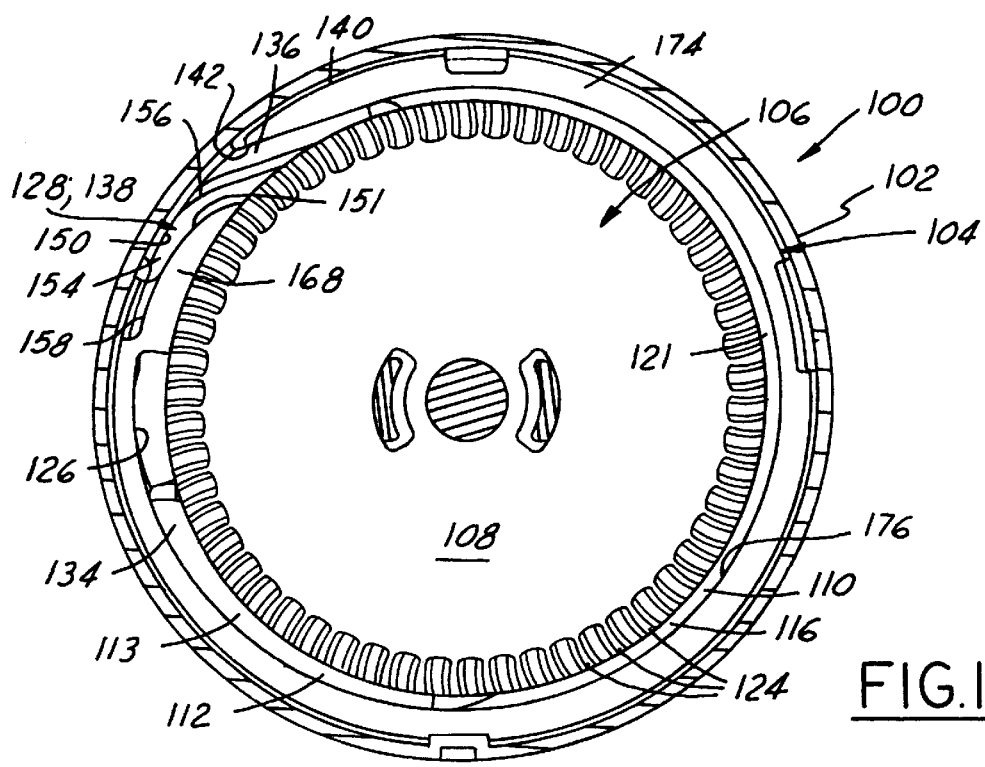
FIG. 12 is a bottom view of a top cover, impeller and guide ring of the fuel pump module of FIG. 8.
Figure 13:
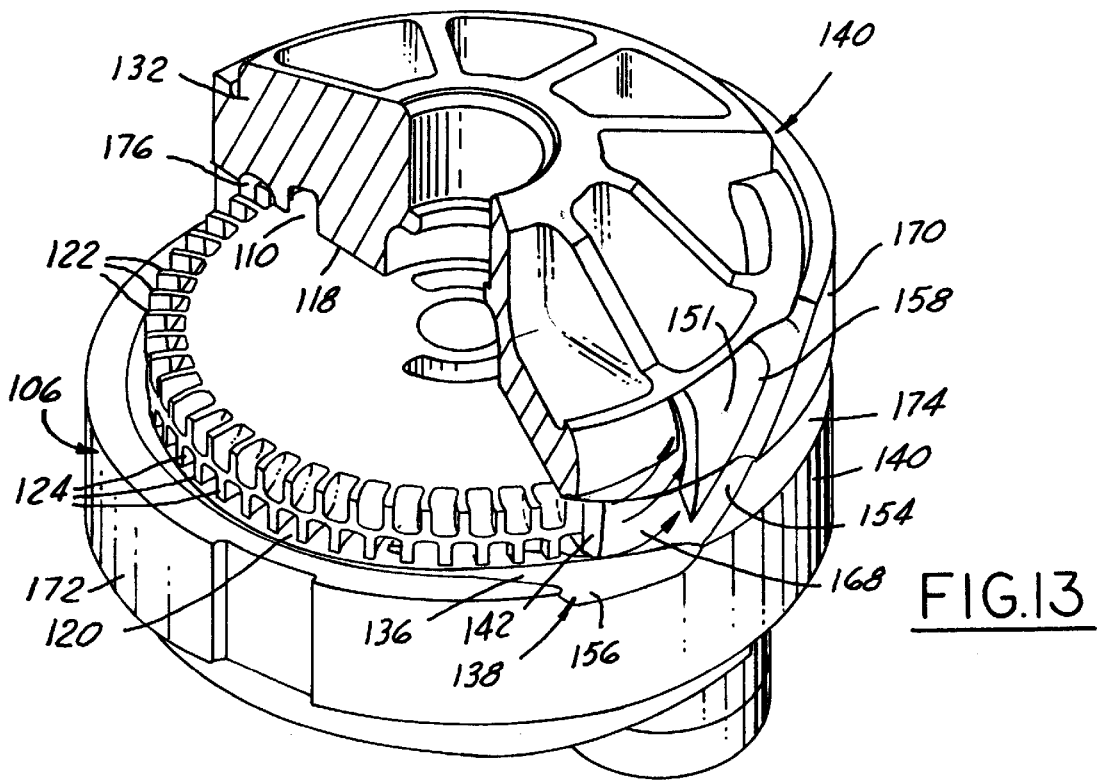
FIG. 13 is a partially broken-away front perspective view of the inventive fuel pump module of FIG. 8 with arrowed lines indicating fluid flow paths.

As is best shown in FIG. 12, the exit passage 136 of the pumping channel 112 extends tangentially outward through the side wall 140 of the module housing 106 and into an upstream end of the trench 138. The exhaust port opening 142 is aligned with the tangential flow of fuel from the exit passage 136 of the pumping channel 112 such that fuel exiting the pumping channel 112 is relatively unimpeded and flows smoothly into the trench 138. To reduce back pressure on the impeller vanes 122, 124, the cross-sectional area of the exit passage 136 of the pumping channel 112, measured normal to the flow direction, increases gradually where the exit passage 136 of the channel opens out into the trench 138.

As shown in FIGS. 8–13, the exit passage 136 of the pumping channel 112 has a generally rectangular cross-section, as viewed in the direction of fluid flow, with rounded corners. The exhaust port opening 142, being defined by the exit end 136 of the pumping channel 112 where it merges into the trench 138, is also roughly rectangular and is disposed generally normal to the flow direction of fuel exiting the pumping channel 112 as best shown in FIG. 12. As is best shown in FIGS. 9, 10, 11 and 13, the exit passage 136 of the pumping channel 112 and the exhaust port 128 are configured, i.e., shaped and positioned, to allow a lower fuel stream exiting the lower portion of the pumping channel 112 to remain parallel to and below an upper fuel stream exiting the upper portion of the pumping channel 112 while flowing into the exhaust port trench 138. More specifically, the exit passage 136 of the pumping channel 112 and the exhaust port opening 142 have vertical (axial) dimensions that exceed the axially-measured thickness of the impeller 108 at the impeller vanes 122, 124. The exit passage 136 of the pumping channel 112 and the exhaust port 128 are also aligned axially with the impeller 108 so as to expose both the upper and lower impeller vanes 122, 124 and to allow the upper and lower fuel streams to exit laterally (along a path in a plane perpendicular to the axis of the impeller) into the exhaust port trench 138 from the upper and lower impeller vanes 122, 124. The exit passage 136 of the pumping channel 112 and the exhaust port 128 are not shaped or positioned to physically separate the upper and lower fuel streams from one another. Instead, the exit end 136 of the pumping channel 112 includes smooth continuous, generally horizontal contours. These contours allow the upper and lower fuel streams to continue moving in a generally parallel manner through the exhaust port 128 rather than forcing their flow paths to cross as they enter the exhaust port trench 138. In other words, contours defining the exit passage 136 of the pumping channel 112 smoothly flow out into contours defining the exhaust port trench 138 at the exhaust port opening 142. This prevents forced mixing of upper and lower streams and further reduces fluid losses that might otherwise be experienced at the exhaust port 128.

Figure 10:
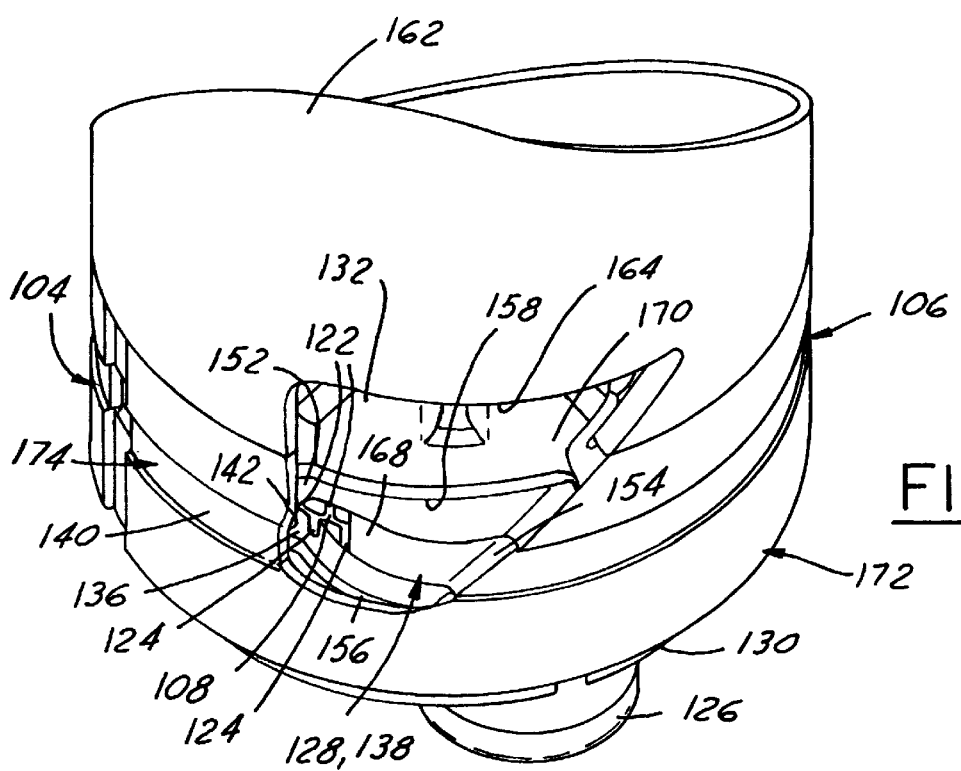
FIG. 10 is a perspective view of a flux tube of the fuel pump assembly of FIG. 8 supported on the fuel pump module of FIG. 9.
Figure 11:
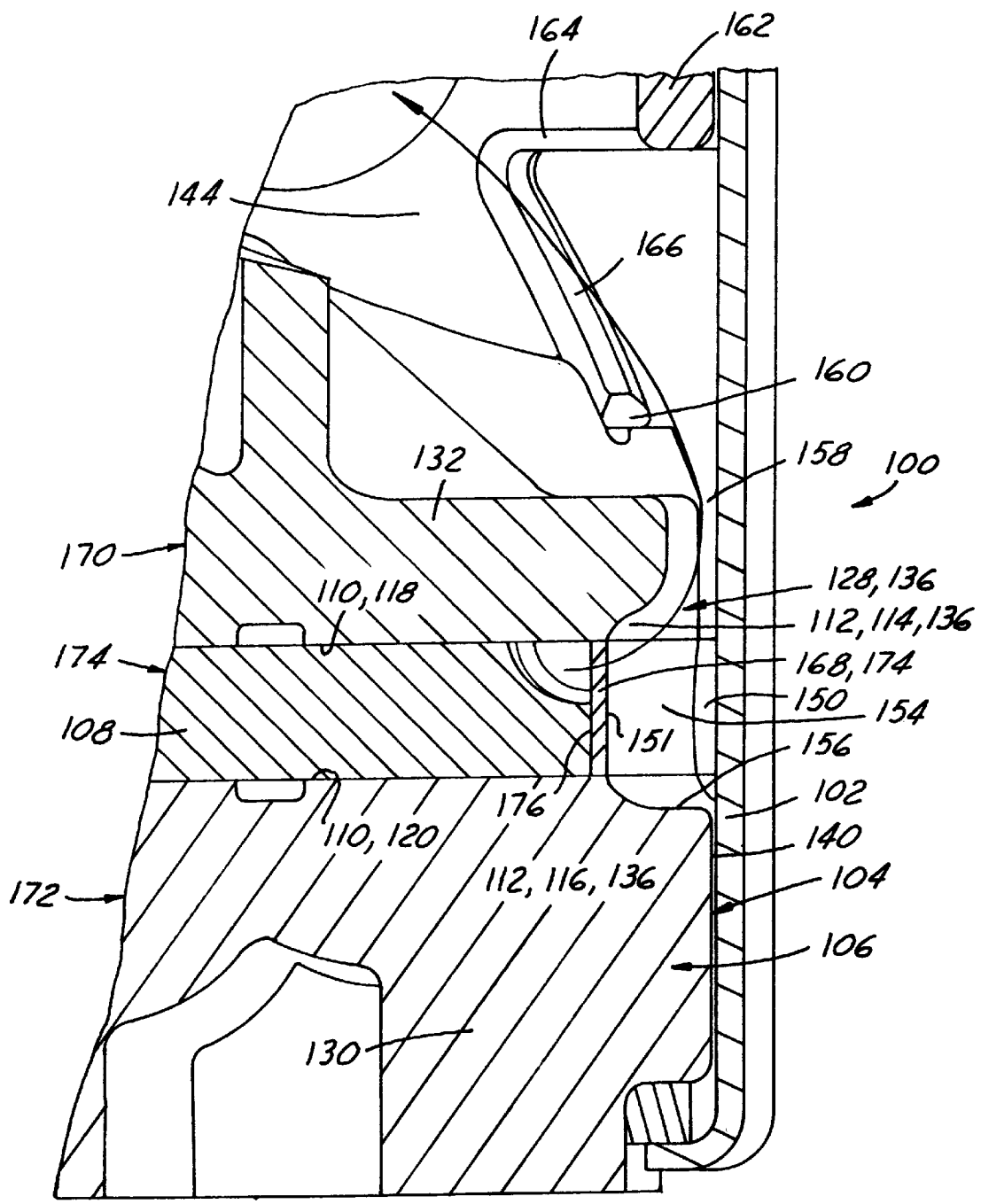
FIG. 11 is an enlarged fragmentary cross-sectional view of a peripheral region of the fuel pump module of FIG. 8 taken from within circle 10 of FIG. 8.

The pump housing 102 surrounds the fuel pump module 104 and defines an arcuate, radially outer wall 150 of the exhaust port trench 138 disposed opposite an arcuate, radially inner wall 151 of the trench 138 as shown in FIGS. 8, 11 and 12. The trench 138 is further defined by a generally vertical end wall 152 (FIGS. 10 and 11) disposed upstream from a ramp 154 that inclines upwardly from a floor 156 of the trench 138, in a downstream direction, i.e., the direction of impeller 108 rotation, to a top surface of the module housing 106.

The exit passage 136 of the pumping channel 112 and the exhaust port opening 142 are configured to align the upper and lower fuel streams with the exhaust port trench 138. The contours of the exhaust port trench 138 smoothly divert the upper and lower fuel streams from their tangential path from the pumping channel 112 to a generally circumferential flow path. The trench 138 contours then smoothly guide this generally circumferential flow of the upper and lower fuel streams up the ramp 154 and out a narrow arcuate upper discharge aperture 158 of the exhaust port trench 138.

As shown in FIGS. 8, 10 and 11, a lower edge 160 of a flux tube 162 of the electric motor 146 is disposed concentrically within the pump housing 102 and abuts an outer circumferential marginal portion of the upper wall 132 of the housing covering the trench 138. The lower edge 160 of the flux tube 162 therefore includes a relieved portion 164 disposed axially over the trench 138 so as not to impede fuel exiting the trench 138. As best shown in FIG. 10, the shape of the relieved portion 164 of the flux tube 162 is generally trapezoidal with one wall 166 of the relieved portion 164 angled to align with and continue the ramp 154 of the exhaust port trench 138.

As is best shown in FIG. 12, the inner wall 151 of the trench 138 is disposed on an arcuately wedge-shaped stripper zone partition 168 configured to block flow from the upper and lower high pressure pumping channel portions 114, 116 immediately downstream from the exit passage 136 of the pumping channel 112 into the low pressure inlet area 126 of the pumping channel 112. The stripper zone partition 168 improves pump efficiency by preventing a significant amount of high-pressure fuel at the exit passage 136 of the pumping channel 112 from escaping past the impeller 108 to the low-pressure intake end of the pumping channel 112.

The pumping module housing 106 includes a top cover 170 defining the upper wall 132 of the module housing 106, a base 172 defining the lower wall 130 of the module housing 106, and a guide ring 174 disposed between the top cover 170 and the base 172. The top cover 170 defines the roof 118 of the impeller cavity 110, the base 172 defines the floor 120 of the impeller cavity 110 and the guide ring 174 defines a circumferential outer wall 176 of the impeller cavity 110.

The exit passage 136 of the pumping channel 112 extends tangentially outward through and is partially defined by the guide ring 174. The exit passage 136 of the pumping channel 112 is also formed into the top cover 170, the base 172 and the guide ring 174. The exhaust port 128 is also formed into the top cover 170, the base 172 and the guide ring 174. A portion of the exhaust port trench 138 and a portion of the exhaust port opening 142 are similarly formed into the guide ring 174.

In operation, the electric motor is energized to rotate the impeller within the module housing which draws fluid axially upward through the inlet port 126 and into a low-pressure region 113 of the pumping channel 112. After traveling approximately 90° along the pumping channel 112, fluid in the upper channel portion 114 is separated from fluid in the lower channel portion 116 by the rib 121. Fluid pressure increases significantly for the next approximately 120° of travel through the pumping channel and along the entire length of the rib 121 separating the fluid being propelled by the upper and lower impeller vanes 122, 124, respectively. From this high-pressure region along the rib 121, the fluid passes into the exit passage 136 of the pumping channel 112. The rib 121 terminates at this point and the fluid flowing out from the upper and lower channel portions 114, 116; rather than being forced to mix at this point, continues in a parallel flow pattern along the exit passage 136 and into the trench 138. As the fluid passes from the exit passage 136 into the trench 138, the outer wall 150 of the trench 138 smoothly redirects the fluid from a tangential flow to a circumferential flow. The fluid is then directed smoothly upward along the ramp 154 and past the top surface of the module housing 106 through the narrow arcuate upper discharge aperture 158 of the exhaust port trench 138. As the fuel exits the trench 138, it continues in a generally circumferential upwardly spiraling motion through the relieved portion 164 of the flux tube 162 and along the ramped wall 166 of the relieved portion 164. The flow continues out of the relieved portion 164 through the chamber 144 of the fuel pump housing 102 that contains the electric motor 146, then flows past the electric motor between the flux tube 162 and the rotor and exits the fuel pump assembly through a fuel pump assembly outlet 145.

This description is intended to illustrate certain embodiments of the invention rather than to limit the invention. Therefore, it uses descriptive rather than limiting words.

Obviously, it's possible to modify this invention from what the description teaches. Within the scope of the claims, one may practice the invention other than as described.

What is claimed is:

1. A fuel pump assembly comprising:
   a fuel pump housing;
   a fuel pump module supported in the pump housing and including:

a module housing including inlet and exhaust ports;
an impeller that is rotatably supported within an impeller cavity formed in the module housing and rotatably driven by an electric motor, the impeller including axially upper and lower impeller vanes spaced around an outer circumferential periphery of the impeller;
a generally semi-circular pumping channel formed in the housing around a circular periphery of the impeller cavity, the impeller vanes being configured and positioned to move fluid through the pumping channel as the impeller rotates within the impeller cavity, the inlet and exhaust ports communicating with respective inlet and exit passages of the pumping channel;
the exit passage of the pumping channel extending generally tangentially outward through the side wall of the module housing, the exhaust port being aligned with the tangential flow of fuel from the exit passage of the pumping channel such that fuel exits the pumping channel relatively unimpeded.

2. A fuel pumping assembly as defined in claim 1 in which the cross-sectional area of the exit passage of the pumping channel increases gradually toward the exhaust port.

3. A fuel pump assembly comprising:
a fuel pump housing;
a fuel pump module supported in the pump housing and including:
  a module housing including inlet and exhaust ports, the exhaust port extending generally axially through a lower wall of the module housing;
  an impeller rotatably supported within an impeller cavity formed in the module housing and rotatably driven by an electric motor, the impeller including axially upper and lower impeller vanes spaced around an outer circumferential periphery of the impeller;
  a generally semi-circular pumping channel including upper and lower pumping channel portions formed into the housing around a circular periphery of the impeller cavity, the impeller vanes being configured and positioned to move fluid through the upper and lower portions of the pumping channel, respectively, as the impeller rotates within the impeller cavity, the inlet and exhaust ports intersecting respective inlet and exit passages of the pumping channel;
  the exhaust port including:
    a trench formed in the module housing along a portion of a circumferential side wall of the module housing adjacent the outlet end of the pumping channel and opening axially upward;
    an opening from the exit passage of the pumping channel into the trench; and
    the exit passage of the pumping channel and the exhaust port opening being configured to allow a lower fuel stream propelled from a lower portion of the exit passage by the lower impeller vanes to remain parallel to and below an upper fuel stream propelled from an upper portion of the exit passage by the upper impeller vanes while flowing into the exhaust port trench.

4. A fuel pump assembly comprising:
a fuel pump housing;
a fuel pump module supported in the pump housing and including:
  a module housing including inlet and exhaust ports, the exhaust port extending generally axially through a lower wall of the module housing;
  an impeller rotatably supported within an impeller cavity formed in the module housing and rotatably driven by an electric motor, the impeller including axially upper and lower impeller vanes spaced around an outer circumferential periphery of the impeller;
  a generally semi-circular pumping channel including upper and lower pumping channel portions formed into the housing around a circular periphery of the impeller cavity, the impeller vanes being configured and positioned to move fluid through the upper and lower portions of the pumping channel, respectively, as the impeller rotates within the impeller cavity, the inlet and exhaust ports intersecting respective inlet and exit passages of the pumping channel;
  the exhaust port including:
    a trench formed in the module housing along a portion of a circumferential side wall of the module housing adjacent the outlet end of the pumping channel and opening axially upward;
    an opening from the exit passage of the pumping channel into the trench; and
    the exhaust port opening and trench being configured to allow lower and upper fuel streams from lower and upper portions of the exit passage, respectively, to both exit directly into the exhaust port trench.

5. A fuel pump assembly comprising:
a fuel pump housing;
a fuel pumping module supported in the pump housing and including:
  a module housing including inlet and exhaust ports, the exhaust port extending generally axially through a lower wall of the module housing;
  an impeller rotatably supported within an impeller cavity formed in the module housing and rotatably driven by an electric motor, the impeller including axially upper and lower impeller vanes spaced around an outer circumferential periphery of the impeller;
  a generally semi-circular pumping channel including upper and lower pumping channel portions formed into the housing around a circular periphery of the impeller cavity, the impeller vanes being configured and positioned to move fluid through the upper and lower portions of the pumping channel, respectively, as the impeller rotates within the impeller cavity, the inlet and exhaust ports communicating with respective inlet and exit passages of the pumping channel;
  the exhaust port including:
    a trench formed in the module housing along a portion of a circumferential side wall of the module housing adjacent the outlet end of the pumping channel and opening axially upward; and
    an opening from the exit passage of the pumping channel into the trench;
  the pump housing surrounding the fuel pumping module and defining a radially outer wall of the exhaust port trench disposed opposite a radially inner wall of the trench.

6. A fuel pumping assembly as defined in claim 1 in which the trench is defined by an end wall disposed upstream from a ramp that inclines from a floor of the trench, in a downstream direction to a top surface of the module housing.

7. A fuel pumping assembly as defined in claim 6 in which the exit end of the pumping channel and the exhaust port opening are configured to align the upper and lower fuel streams with the exhaust port trench and the exhaust port trench is configured to smoothly guide the upper and lower fuel streams up the ramp.

8. A fuel pumping assembly as defined in claim 1 in which the pumping module housing includes a top cover defining the upper wall of the housing, a base defining the lower wall of the housing, and a guide ring disposed between the top cover and the base; the top cover defines the roof of the impeller cavity, the base defines the floor of the impeller cavity and the guide ring defines a circumferential outer wall of the impeller cavity.

9. A fuel pumping assembly as defined in claim 8 in which the exhaust end of the pumping channel extends tangentially outward through and is at least partially defined by the guide ring.

10. A fuel pumping assembly as defined in claim 8 in which at least a portion of the exhaust port trench is formed into the guide ring.

11. A fuel pumping assembly as defined in claim 8 in which at least a portion of the exhaust port opening is formed into the guide ring.

12. A fuel pumping assembly as defined in claim 8 in which the exit end of the pumping channel is formed into the top cover, the base and the guide ring.

13. A fuel pumping assembly as defined in claim 8 in which the exhaust port is formed into the top cover, the base and the guide ring.

* * * * *

UNITED STATES PATENT AND TRADEMARK OFFICE
CERTIFICATE OF CORRECTION

PATENT NO. : 6,227,819 B1  Page 1 of 1
DATED : May 8, 2001
INVENTOR(S) : Bryan J. Gettel et al.

It is certified that error appears in the above-identified patent and that said Letters Patent is hereby corrected as shown below:

Title page,
The name of the inventors should read as follows:
Item [75]  Bryan J. Gettel, Pigeon;
 Glenn A. Moss, Cass City;
 Joseph M. Ross, Millington,
 Bradley L. Uffelman, Caro, all of MI (US)

Signed and Sealed this

Twenty-fifth Day of December, 2001

Attest:

*Attesting Officer*

JAMES E. ROGAN
*Director of the United States Patent and Trademark Office*